OR  3,609,371

United St[ates]

[11] 3,609,371

[72] Inventor Jean Claude Jacob
  Plaisir, France
[21] Appl. No. 736,073
[22] Filed June 11, 1968
[45] Patented Sept. 28, 1971
[73] Assignee Intertechinique S.A.
  Plaisir, France

[54] MECHANISM FOR POSITIONING A RADIOACTIVE SOURCE IN A LIQUID SCINTILLATION COUNTER
  6 Claims, 4 Drawing Figs.
[52] U.S. Cl. .................................. 250/106,
  74/50, 250/52
[51] Int. Cl. .......................................... G01t 7/08
[50] Field of Search........................................... 250/106
  SC, 71.5, 52; 74/50

[56] References Cited
UNITED STATES PATENTS
2,986,948  6/1961  Jensen.......................... 74/50
3,188,468  6/1965  Packard ....................... 250/71.5

Primary Examiner—James W. Lawrence
Assistant Examiner—Morton J. Frome
Attorney—Cameron, Kerkam & Sutton ABSTRACT: A mechanism for positioning a standard gamma emitter for use as an external standard in a liquid scintillation spectrometer as adapted to move the emitter between a shielded position in a metal body and an operative position close to a sample to be standardized. The mechanism comprises a rotatable disk, an arm carrying the emitter and connected to a motor by a driving mechanism which successively moves the emitter radially inward with respect to the disk, along a part circular path along with the disk and radially outward upon energization of the motor.

MECHANISM FOR POSITIONING A RADIOACTIVE SOURCE IN A LIQUID SCINTILLATION COUNTER

The invention relates to a mechanism for positioning an object such as a radioactive source and finds an important but in no way exclusive use in liquid scintillation spectrometry.

Most liquid scintillation spectrometers now in use are designed for providing determination of the amount of quenching in the samples to be counted by a process which is generally referred to as "external standardization." According to this method each sample is counted twice: one of the counts is conducted in normal fashion. For the other counting, an "external standard" — generally a point source containing a relatively high level of gamma activity—is located in a location in operational relationship with the sample. The added counts induced within the sample by the external source are a measure of the quality of the sample and are related to the counting efficiency (that is the amount of quenching) in the sample.

External standardization may be used in either of two ways: the counting efficiency may be determined from a calibration curve which gives the efficiency versus the added counts due to the external standard source in a predetermined energy window. As long as the position of the source with respect to the sample is reproducible and all vials contain the same volume of sample, this method provides satisfactory results. If on the contrary different volumes are expected it is preferable to use an improved method which is generally known as "channel ratio external standardization:" the counts induced by the external standard gamma source are recorded in two separate channels corresponding to different energy windows. Use is made of a calibration chart or curve correlating the counting efficiency and the ratio between the counts in the two channels, which is relatively independent of the sample volume.

In the most advanced liquid scintillation spectrometers, all handling operations and corrections are controlled by a computer associated with a memory in which the calibration curves are stored. This calibration curve is preferably defined by a formula representative of a geometrical curve closely adhering to experimentally determined data points. While much simplifying the electronics this method provides a satisfactory accuracy.

Methods of external standardization in current use rely on accurate reproducibility of the position of the standard source when it is in operational relationship with the sample. The difficulty of achieving this accurate positioning is compounded by the requirement that the source be positioned remotely and shielded from the sample when the sample only is being measured in order that gamma rays arising from the source exert no influence upon the sample. Important requirements for the source-positioning mechanism are that it be reliable, require limited maintenance and especially that it not be prone to jamming on its passage into or out of operational relationship with the sample.

It is an overall object of the present invention to provide a mechanism for positioning a radioactive source which fulfills the above requirements.

It is another object of the invention to provide a mechanism adapted to move the source between its two extreme positions along a path comprising a radial movement toward an axis, a translation along a part circular path about said axis and another radial movement, thereby providing space for locating efficient shielding against gamma rays.

It is still another object of the invention to provide a mechanism which is relatively simple, rugged and free of sources of jamming and wear.

The nature and objects of the invention will be better understood from the following description of one embodiment of the invention given as a nonlimitative example.

The description refers to the accompanying drawings in which.

Figure 1:
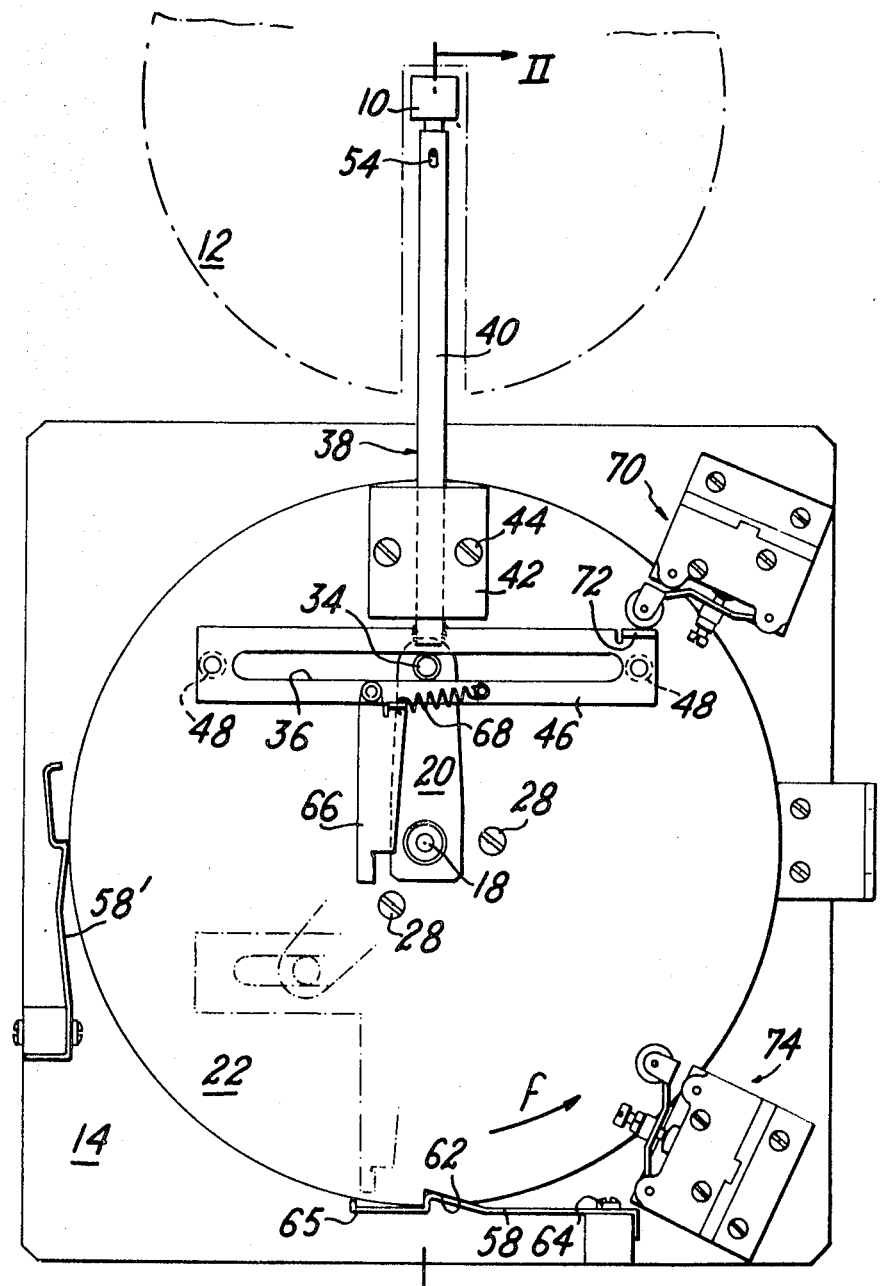
FIG. 1 is a plane view of the mechanism in rest condition, the source being located in a shielding body delineated in dash-dot lines for more clarity.
Figure 2:
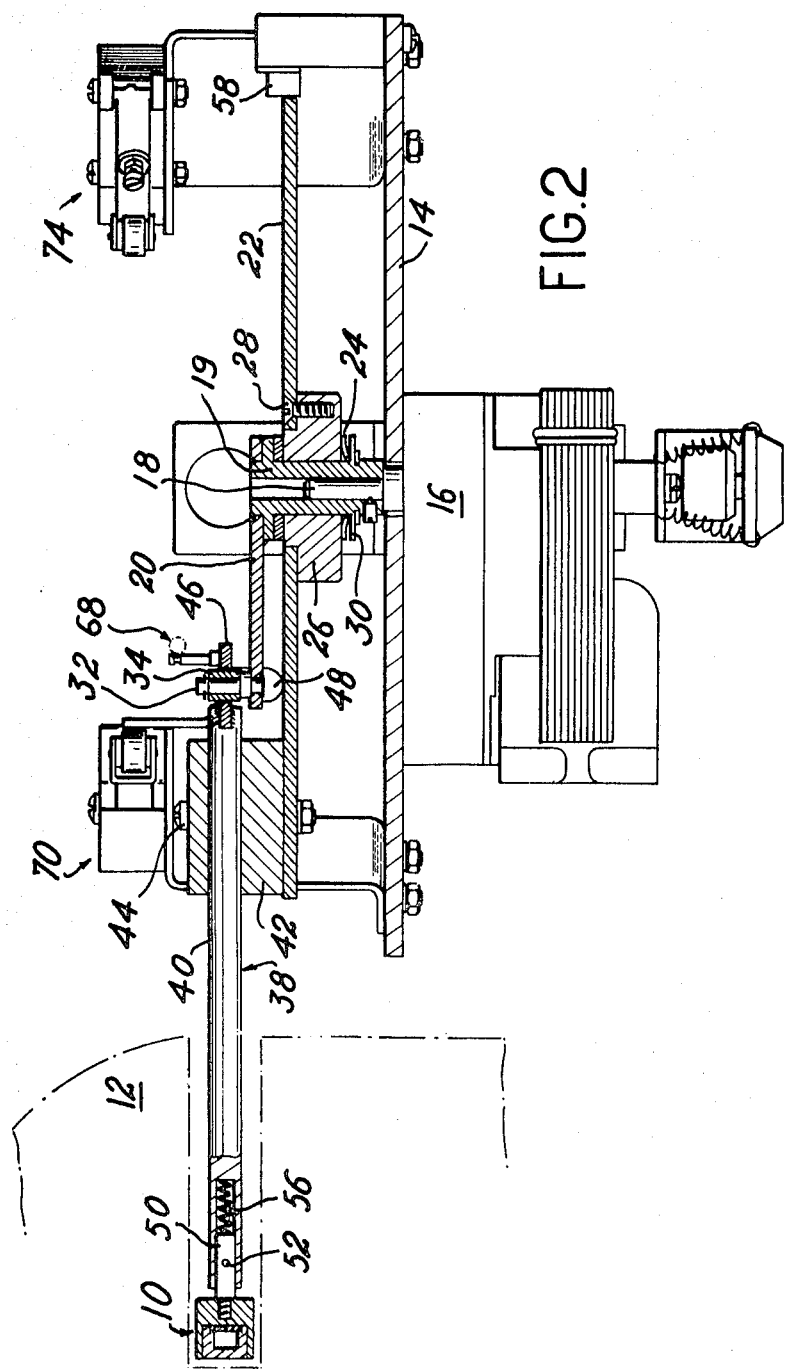
FIG. 2 is a sectional view along line II—II of FIG. 1.

Referring to FIGS. 1 and 2 there is shown in full line a mechanism for displacing a source 10 between a rest or inoperative position and a working position. During such a displacement the source is successively moved radially inwardly (out of the shielding body 12 if it is initially in its rest position), angularly by 90° or 270°, and radially outwardly.

The source 10 may consist of material which emits penetrating gamma radiation encapsulated in a leaktight cladding.

The mechanism comprises a stationary frame including a horizontal support plate 14 which carries a one-way electric motor 16 associated with a friction brake which prevents the motor from coasting and from drifting when not energized. A sleeve 19 is securely connected on the shaft 18 of motor 16 and a driving arm 20 is secured to the sleeve 19, for instance by welding, so that upon energization of the motor the arm is driven by shaft 18 and rotates in the direction of arrow $f$ (FIG. 1) in a plane parallel to plate 14.

A support disk 22 parallel to plate 14 is driven in rotation by the motor 16 through an overload coupling: the coupling illustrated in FIG. 2 is of the friction type and comprises a resilient washer 24 retained between a hub 26 connected to the disk by screws 28 and a ring 30 carried by sleeve 19.

The end portion of arm 20 remote from shaft 18 carries a pin 32 parallel to the shaft. A roller 34 rotatable on pin 32 engages a slot 36 formed in a T-shaped source-carrying unit 38. This unit comprises a rod 40 slidably received in a radial passage of a guide member 42, connected to the peripheral portion of disk 22, for instance by screws 44. The guide member 42 is of material having a low friction coefficient such as "nylon." Unit 38 also comprises a transverse member 46 secured to rod 40, for instance by welding. The slot 36 is provided in member 46. The slot illustrated on FIG. 2 is straight and perpendicular to rod 40 but other shapes would be possible. The width of the slot is in any case such that roller 34 has a sliding fit in the slot for avoiding backlash.

The transverse member 36 is provided with two bearing pads 48 of low friction material such as "nylon" adapted to slide on the smooth upper surface of disk 22.

Source 10 is preferably connected to rod 40 by a structure adapted to yield under radial compression for a purpose which will become apparent later. In the embodiment illustrated in FIG. 2, the source 10 has a threaded connection with a stem 50 slidably received in a blind bore formed in the terminal portion of rod 40. The extent of movement of the stem 50 in the bore is limited by a transverse pin 52 retained in an elongated passage 54 of rod 40 (FIG. 1). A helical spring 56 is located in the bore and forces the source 10 radially outward toward a position where pin 52 engages the outer end of slot 54.

Figure 3:
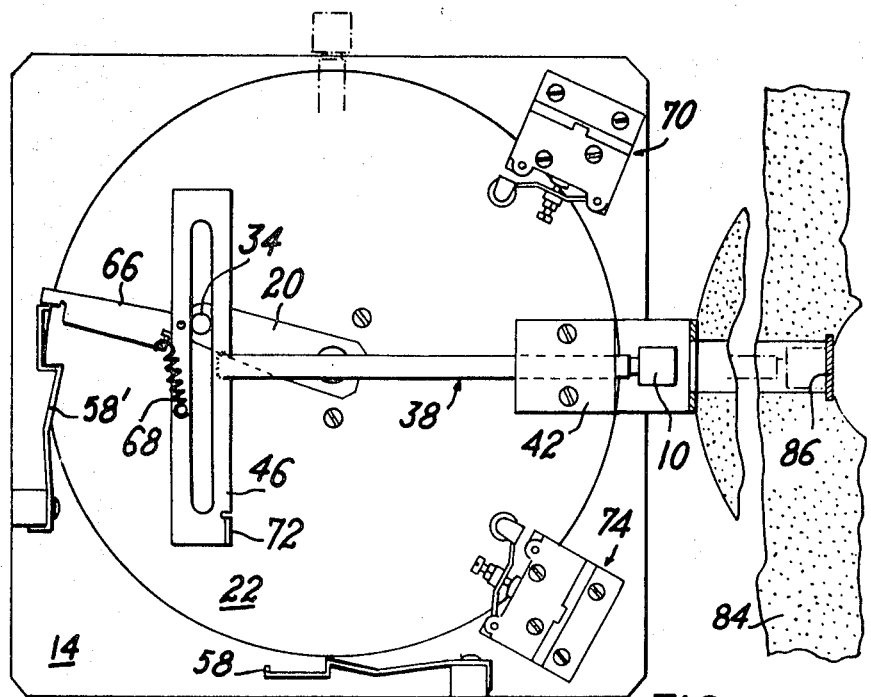
FIG. 3 is a schematic plan view of the mechanism with the parts illustrated in the positions they assume when the source has been angularly indexed in front of its working position and initiates its radial outward movement.

Locking means are provided for retaining the support disk 22 against rotation in a plurality of predetermined angular positions (two positions in the embodiment of FIGS. 1, 2 and 3). Two latch members 58 and 58' connected to the support plate 14 are each adapted to engage in a triangular notch 62 formed in the peripheral edge of disk 22 for retaining the disk in two predetermined angular positions which correspond to rest condition and operating condition of the source, respectively. The locking member 58 consists of a strip of resilient material such as steel having one end connected to the support plate 14, for instance by a screw 64. An intermediate portion is conformed with a folded portion adapted to slide on the periphery of the disk and to engage into slot 62. Beyond the folded portion the strip has a projection 65 adapted to be positively engaged by a mechanism associated with the source-carrying unit. The locking member 58' is of similar construction.

The mechanism for rendering the locking members inoperative and for releasing the disk upon radially inward movement of unit 38 beyond a predetermined position with respect to the disk 22 consists in a lug 66 pivotally connected to the transverse member 46. The lug is biased by a holddown spring 68 (FIG. 1) toward an abutting position where the lug 66 projects in the direction opposite to that of rod 40 with respect to the transverse member 46. The lug 66 is so located on the transverse member 46 and is of such length that, when the source-carrying unit 38 approaches its extreme inward position (as indicated in dash-dot lines on FIG. 1), the lug 66 engages the projecting portion 65 of the corresponding locking member and lifts it clear of notch 62 thereby releasing the disk.

In the embodiment illustrated in the drawings, electrical microswitches are provided for automatically deenergizing motor 16 when the source 10 reaches its radially outward extreme position. As illustrated in FIG. 1, a microswitch 70 carried by the support plate 14 is actuated by a bent-over portion 72 of the transverse member 46 when the source-carrying unit 38 approaches completion of its outward movement toward its rest position.

Another microswitch 74 is similarly closed by the bent-over portion 72 when the source comes into its operative position.

Operation of the mechanism will now be described with reference to FIG. 4 which illustrates a typical block diagram of a circuitry suitable for use in a liquid scintillation spectrometer: modified circuits could be used obviously for other purposes.

Starting with the components in the positions illustrated in FIGS. 1 and 2, the source is in rest condition, the motor is deenergized, the arm 20 is substantially aligned with the blind passage formed in the shielding body 12 for receiving the source 10, the bent-over portion 72 of the transverse member 46 closes the microswitch 70, the locking member 58 is engaged in slot 62 and retains the disk against rotation.

Figure 4:
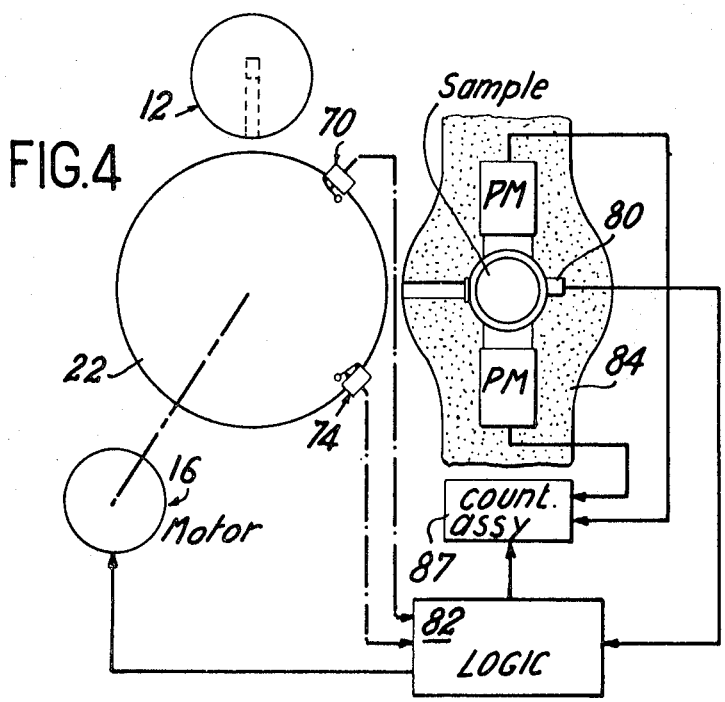
FIG. 4 is a very simplified block diagram of a possible circuitry associated with the mechanism.

Referring now to FIG. 4, a sample to be counted is moved down to a working position by a sample changer (not shown) which may be of the type disclosed in Thomas et al. U.S. Pat. application Ser. No. 716,213 assigned to the assignee of the present invention. Upon arrival of the sample to its working position, a microswitch 80 is closed and provides a triggering pulse to a control system incorporating a program which will determine the sequence of operations.

The control system then energizes motor 16 for rotation of the shaft 18 in the direction of arrow *f*. Since the disk 22 is retained by the locking member 58, the friction connection between shaft 18 and the disk slips and arm 20 rotates with respect to the disk. The roller 34 slides in the elongated opening 36 and drives the source-carrying unit 40 radially inwardly. The sinusoidal motion of unit 38 affords gentle starting thereof, contributing to low wear. Continuing rotation of arm 20 results in source 10 moving along the blind passage out of the shielding body 12 while the lug 66 approaches projection 65. When arm 20 comes close to the position diametrically opposite to that illustrated in FIG. 1 the lug 66 engages projection 65 of locking member 58 and lifts it clear of notch 62, thereby releasing the disk. From that time on, the disk 22 and arm 20 move synchronously until the disk is latched again. After the notch 62 has moved past the bent portion of locking member 58, lug 66 abuts that bent portion. The lug pivots about its axis, while the helical spring 68 tensioned between the lug 66 and the transverse member 46 yields for permitting that movement. As soon as the lug has moved past the bent portion, the spring brings back the lug to its normal abutting position.

Continued movement of the motor brings the disk 22 and arm 20 to a position illustrated in full lines on FIG. 3. When the disk arrives to a position separated by 270° from the rest position, the latch member 58' engages notch 62, thereby locking the disk again. As shown on FIG. 3, when the disk 22 and arm 20 complete their 270° rotation, the lug 66 abuts the end projection of latch member 58', and rotates about its pivot pin against the return force of the tension spring 68: due to this rocking movement of lug 66, the latch member remains free to enter the notch.

From the time the disk is locked, the arm 20 moves along upon continuing rotation of motor 16. Relative movement of the arm 20 and disk 22 results in radially outward movement of the rod 40 and source 10 into a blind passage in another shielding body 84 (FIG. 3). As soon as unit 38 initiates its outward movement, lug 66 moves clear of the latch member 58' and snaps to normal position under the action of spring 68.

A partition 86 closes the passage in body 84, whose length is so selected with respect to the extent of the outward movement of the source-carrying unit that the source abuts the partition 86 prior to completion of the outward movement of unit 38. This construction guarantees that upon completion of the outward movement of the unit the source will be in a well-defined position. This is essential since the position of the source should be precisely reproducible for external standardization to be accurate. Due to the sinusoidal motion of the source-carrying unit, abutment of the source is rather soft and cannot damage the mechanism.

Upon completion of the outward travel of the unit 38, the bent-over portion 72 closes the microswitch 74, thereby providing to the control logic 82 a pulse. Responsive to that pulse, the logic 82 deenergizes motor 16 and provides to the counting assembly 87 (FIG. 4) a triggering signal which results in a count for a predetermined time (30 sec. for instance) to be carried out on the sample subjected to the penetrating radiation from source 10.

At the expiration of the counting time, the control logic energizes motor 16 again for withdrawal of the source from the body 84, reindexing of the source in front of the passage in the shielding body 12 and introduction of the source up to its rest position. When the source comes to that position, the bent-over portion 72 of the unit 46 closes to microswitch 70, thereby providing to the control logic 82 a pulse which stops the motor 16. The other counting operations carried out on the sample not associated with the source may be conventional.

From the foregoing it can be seen that the present invention provides an improved mechanism for moving a source between two predetermined positions which are accurately defined so that the action of the source on a sample is perfectly reproducible. It should of course be understood that the foregoing description is merely illustrative of the invention and that various modifications within the scope of the invention could easily be designed by those skilled in the art.

I claim:

1. A counter for determination of β activity of liquid samples by liquid scintillation, comprising a mechanism for moving a source of penetrating radiations between a first predetermined position where said source is shielded and a second predetermined position where said source is in operating association with a liquid scintillation sample, said mechanism comprising:

a stationary frame, a support member rotatable on said frame about an axis, motor means frictionally driving said support member in rotation about said axis in one predetermined direction, a source-carrying unit, guiding means carried by said support member receiving said unit for sliding movement thereof radially to said axis, and resilient locking means for retaining said support member in either of two predetermined angular positions which are spaced apart by an angle different from 180°, a body of shielding material formed with a first blind passage radial to said axis, a body of shielding material formed with a second blind passage radial to said axis and separated from a chamber from said samples by a partition relatively transparent to said penetrating radiations, said first and second passages being located in alignment with said unit when said support member is retained in said first and second angular positions respectively, connecting means between said unit and said motor means for moving said unit radially when said support is retained against rotation and for rotating said unit in synchronism with said support when said support is released from said locking means, a portion of said connecting means being adapted to abut said locking means and to positively force said locking means out of engagement with said support upon radially inward movement of unit beyond a predetermined position with respect to said support member, means responsive to radial movement of said unit for deenergizing said motor upon outward movement of said unit beyond a predetermined position.

2. A mechanism according to claim 1, wherein said source is connected to said rod by a resilient connection adapted to yield in a direction radial to said axis and wherein said second blind passage is of such depth that said source abuts said partition prior to completion of the radially outward movement of said rod.

3. A mechanism according to claim 1, wherein said unit is of T shape and comprises a rod carrying said source and slidable in said guiding means, a transverse member secured to said rod, and pads of low friction material carried by said transverse member and bearing on said support member, said transverse member being formed with an elongate slot perpendicular to said rod and receiving a roller driven by said motor along a circular path centered on said axis.

4. A mechanism according to claim 3, wherein said locking means comprise strips of resilient material carried by said frame, adapted to resiliently engage into notches at the periphery of a disk constituting said support member and so shaped as to be engaged by a lug carried by said transverse members upon inward movement of said unit.

5. A mechanism according to claim 3 having two switches carried by said frame, means on said transverse member adapted to actuate said switches upon radially outward travel of said rod, and circuitry associated with said switches for deenergizing said motor upon actuation of said switches.

6. A mechanism according to claim 5 having control means for energizing said motor upon occurrence of predetermined conditions after actuation of one of said switches.